US010471898B2

(12) United States Patent
Murray et al.

(10) Patent No.: US 10,471,898 B2
(45) Date of Patent: Nov. 12, 2019

(54) ROLL COVER ASSEMBLY

(71) Applicant: Ford Global Technologies, LLC, Dearborn, MI (US)

(72) Inventors: Andrew John Murray, Colchester (GB); Richard Craven, Chelmsford (GB); Daniel Berry, Hockley (GB); James Neugebauer, Chelmsford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/410,240

(22) Filed: Jan. 19, 2017

(65) Prior Publication Data
US 2017/0129408 A1 May 11, 2017

Related U.S. Application Data

(63) Continuation of application No. 14/602,614, filed on Jan. 22, 2015, now Pat. No. 9,573,527.

(30) Foreign Application Priority Data

Jan. 22, 2014 (GB) .................................. 1401061.5

(51) Int. Cl.
*B60R 5/04* (2006.01)
*E06B 9/08* (2006.01)
*E06B 9/80* (2006.01)
(52) U.S. Cl.
CPC .............. *B60R 5/047* (2013.01); *E06B 9/08* (2013.01); *E06B 9/80* (2013.01)
(58) Field of Classification Search
CPC .............. B60R 5/047; E06B 9/08; E06B 9/56
(Continued)

(56) References Cited

U.S. PATENT DOCUMENTS 2,851,303 A     9/1958  McQueen
3,591,981 A  *  7/1971  Law ...................... E05F 15/605
                                                      49/139

(Continued)

FOREIGN PATENT DOCUMENTS

DE       19532276 A1    4/1997
EP        1574394 B1    4/2009

OTHER PUBLICATIONS

Intellectual Property Office, Search Report for the corresponding Great Britain Patent application No. GB1401061.5, dated Jul. 8, 2014.

*Primary Examiner* — Daniel P Cahn
(74) *Attorney, Agent, or Firm* — Vichit Chea; Brooks Kushman, P.C.

(57) ABSTRACT

A roll cover assembly for covering a cargo space of a vehicle includes a cassette housing an extendable/retractable roll cover, a first receptacle adjacent a first side wall of the cargo space and having a channel configured to slidably guide a first end of the cassette during insertion or removal, a second receptacle adjacent a second side wall of the cargo space and having an opening configured to receive a second end of the cassette and permit pivoting of the cassette about the second end during removal of the first end from the first receptacle, a locking mechanism releasably locking the first end of the cassette into the first receptacle, and a release device actuatable to release the locking mechanism by pulling along a line-of-action parallel with a direction in which the first end of the cassette moves during removal from the first receptacle.

14 Claims, 7 Drawing Sheets

(58) Field of Classification Search
USPC .................................................. 160/24, 291
See application file for complete search history.

(56) References Cited

U.S. PATENT DOCUMENTS

| | | | | |
|---|---|---|---|---|
| 3,611,977 | A * | 10/1971 | Mosvold | B63B 21/62 |
| | | | | 114/246 |
| 4,168,094 | A * | 9/1979 | Yagi | B60R 5/047 |
| | | | | 296/37.16 |
| 4,587,695 | A | 5/1986 | Jensen | |
| 4,668,001 | A * | 5/1987 | Okumura | B60R 5/047 |
| | | | | 248/268 |
| 5,098,149 | A | 3/1992 | Lee | |
| 5,224,748 | A * | 7/1993 | Decker | B60R 5/047 |
| | | | | 296/37.16 |
| 5,485,971 | A * | 1/1996 | Nakaya | B60R 22/405 |
| | | | | 242/381.1 |
| 5,538,306 | A | 7/1996 | Ament | |
| 5,618,077 | A | 4/1997 | Ament et al. | |
| 5,676,415 | A | 10/1997 | Ament et al. | |
| 5,727,836 | A * | 3/1998 | Hosoya | B60R 5/047 |
| | | | | 296/37.1 |
| 5,758,919 | A | 6/1998 | Matheis | |
| 5,813,449 | A | 9/1998 | Patmore et al. | |
| 5,881,793 | A * | 3/1999 | Righter | B60R 5/047 |
| | | | | 160/323.1 |
| 5,961,172 | A | 10/1999 | Ament et al. | |
| 6,039,105 | A | 3/2000 | Patmore et al. | |
| 6,125,908 | A | 10/2000 | Ament et al. | |
| 6,213,186 | B1 * | 4/2001 | Torres | B60J 1/2038 |
| | | | | 160/24 |
| 6,402,217 | B1 | 6/2002 | Ament et al. | |
| 6,427,500 | B1 | 8/2002 | Weinerman et al. | |
| 6,488,325 | B1 * | 12/2002 | Ehrenberger | B60R 5/047 |
| | | | | 296/37.16 |
| 6,554,339 | B1 * | 4/2003 | Moore | B60R 7/005 |
| | | | | 280/749 |
| 6,913,303 | B2 | 7/2005 | Kobiela et al. | |
| 7,014,239 | B2 | 3/2006 | Ehrenberger | |
| 7,066,520 | B2 * | 6/2006 | Kim | B60R 5/047 |
| | | | | 296/37.16 |
| 7,082,983 | B2 * | 8/2006 | Coulibaly | B60J 1/2063 |
| | | | | 160/306 |
| 7,118,152 | B2 * | 10/2006 | Cucknell | B60R 5/047 |
| | | | | 296/37.16 |
| 7,201,417 | B2 * | 4/2007 | Teo | B60R 5/047 |
| | | | | 160/250 |
| 7,354,087 | B2 | 4/2008 | Ehrenberger et al. | |
| 7,604,272 | B2 * | 10/2009 | Day | B60R 5/047 |
| | | | | 296/100.12 |
| 7,628,437 | B2 | 12/2009 | Zaiser et al. | |
| 7,661,742 | B2 * | 2/2010 | Medlar | B60R 5/04 |
| | | | | 296/37.14 |
| 8,167,349 | B1 * | 5/2012 | Cha | B60R 5/047 |
| | | | | 160/370.22 |
| 8,596,703 | B2 * | 12/2013 | Nedelman | B60R 5/047 |
| | | | | 160/272 |
| 9,573,527 | B2 * | 2/2017 | Murray | B60R 5/047 |
| 2007/0170728 | A1 | 7/2007 | Terhaar et al. | |
| 2008/0173411 | A1 | 7/2008 | Bernhardsson et al. | |
| 2018/0134251 | A1 * | 5/2018 | Hashimoto | B60R 22/46 |

* cited by examiner

ROLL COVER ASSEMBLY

CROSS-REFERENCE TO RELATED APPLICATIONS

This application is a continuation of U.S. application Ser. No. 14/602,614 filed Jan. 22, 2015, now U.S. Pat. No. 9,573,527, issued on Feb. 21, 2017, which, in turn, claims foreign priority benefits under 35 U.S.C. § 119(a)-(d) to GB 1401061.5 filed Jan. 22, 2014, which are hereby incorporated by reference in their entirety.

TECHNICAL FIELD

The present disclosure relates to a roll cover assembly for a vehicle, in particular, but not exclusively, a roll cover assembly with a release device configured to be activated in substantially the same plane and direction in which the roll cover assembly is configured to move upon removal.

BACKGROUND

A conventional roll cover assembly (often referred to as a tonneau) is retained in place by a stiff lateral spring assembly. Such springs can require significant effort to be applied in order to release the tonneau from the vehicle when not in use. The lateral (cross-vehicle) orientation of the springs mean the user has to overcome the spring force themselves, often at arm's length and with no mechanical assistance being provided by the hardware. In addition to the physical effort required to compress the springs, because of the installed location of the tonneau within the vehicle, the task often requires the user to stretch awkwardly or clamber into the vehicle.

The present disclosure seeks to address these issues.

SUMMARY

According to an aspect of the present disclosure there is provided a roll cover assembly for covering a cargo space of a vehicle, the roll cover assembly comprising a roll cover and a cassette for receiving or housing the roll cover, the cassette comprising first and second ends configured to engage respective first and second receptacles of the cargo space, wherein the roll cover assembly further comprises a locking mechanism configured to selectively lock the cassette in the first and/or second receptacles; and a release device configured to selectively release the locking mechanism. The release device may be configured to be activated with a line-of-action that passes through the cassette. The release device may be configured to be activated with a line-of-action that has a component in substantially the same direction in which the cassette is configured to move upon removal from the first and second receptacles.

Advantageously, the roll cover assembly may facilitate removal of the cassette in a single action. Furthermore, the roll cover assembly may reduce the tendency for the cassette to twist about its longitudinal axis which would otherwise interfere with the removal.

The release device may be configured such that the activation line-of-action is closer to a lower surface of the cassette than an upper surface of the cassette. The release device may be configured such that the activation line-of-action is at or towards the lower surface of the cassette. (The terms "upper surface" and "lower surface" of the cassette refer to the orientation of the cassette when installed in the vehicle.)

The release device may be configured to be activated in a direction substantially parallel to and between planes defined, e.g., generated, by upper and lower surfaces of the cassette as the cassette is removed from the first and second receptacles. The release device may be configured to be activated in a direction closer to the plane defined by the lower surface of the cassette than the plane defined by the upper surface of the cassette as the cassette is removed from the first and second receptacles.

The release device may be operatively coupled to the cassette at a point between the upper and lower surfaces of the cassette. The release device may be provided below the roll cover. The release device may be configured such that the release device may extend in a direction substantially parallel to the direction in which the cassette moves during removal, e.g., when the release device is activated.

The locking mechanism may comprise one or more latching members. The latching members may be configured to selectively latch in one or more recesses provided in the corresponding receptacles. The latching members may be resiliently biased into a locked position, e.g., by virtue of a spring or other resilient member. The latching members are released from the locked position in the recesses by the release device.

The materials at the interface between the latching members and the recesses may be selected for their low friction properties, e.g., to facilitate retraction of the latching members from the recesses. The materials at the interface between the latching members and the recesses may comprise low friction plastics, such as PTFE.

The latching members may comprise wedge-shaped portions. The wedge-shaped portions may assist in moving the latching members into a retracted position, e.g., by virtue of the interaction between the latching members and the walls of first and/or second receptacles as the cassette is inserted into the first and/or second receptacles.

The locking mechanism may comprise a rack and pinion mechanism. The release device may be operatively coupled to a pinion, e.g., a pinion gear, of the rack and pinion mechanism. Alternatively, the release device may be connected to a rack of the rack and pinion mechanism. The latching members may be operatively coupled to one or more racks of the rack and pinion mechanism.

The release device may be connected to a rotatable carrier. The carrier may be connected to the pinion with a common axis of rotation. The release device may be connected to the carrier at a point with a distance from the common axis that may be greater than the radius of the pinion at the interface with a rack of the rack and pinion mechanism. The release device may be provided with a mechanical advantage, e.g., so as to increase the force that retracts the latching members.

The locking mechanism may comprise a cam and a corresponding cam surface. The release device may be operatively coupled to one of the cam or cam surface. The latching members may be operatively coupled to the other of the cam and cam surface such that the latching members may be releasable by virtue of an interaction between the cam and cam surface. Again, the release device may be provided with a mechanical advantage, e.g., so as to increase the force that retracts the latching members.

The locking mechanism may comprise a guide configured to redirect movement of the release device. The guide may comprise a pulley, post or any other guide means. The latching members may be operatively coupled to the release device. The latching members may be releasable by virtue of the guide redirecting the movement of the release device.

The release device may comprise a flexible member, such as a strap, tag, cord, band, rope, belt, chain or any other flexible member. The flexible member may be configured for pulling by a user, e.g., to remove the cassette from the first and second receptacles. When pulled by the user, the flexible member may ensure that the pulling line-of-action passes through the cassette and with a component in substantially the same direction in which the cassette moves by virtue of the pulling. The release device may otherwise comprise a rigid member that may be configured for pulling by a user, e.g., to remove the cassette from the first and second receptacles. Such a rigid member may be orientated to ensure that the pulling line-of-action passes through the cassette and with a component in substantially the same direction in which the cassette moves by virtue of the pulling. In either case, the release device may comprise a handle formation, such as a loop, knob, handle or any other formation, which may serve as a handle for the user.

The roll cover assembly may further comprise the first and second receptacles of the cargo space. For example, the roll cover assembly may further comprise side interior trim portions, which in turn comprise the first and second receptacles. The receptacles may comprise one or more recesses for receiving latching members of the locking mechanism.

One of the first and second receptacles may comprise a channel, e.g., in the side trim. The channel may be disposed in a substantially longitudinal direction of the vehicle, e.g., from back to front. The channel may be configured to slidably guide the corresponding first or second end of the cassette during insertion or removal. The release device may be provided at a point on the cassette such that the release device may be concealed in the channel when the cassette is in the installed position.

The other of the first and second receptacles may comprise an opening, e.g., in the opposite side trim. The opening may be configured to rotatably receive the corresponding first or second end of the cassette during insertion or removal. In other words, the corresponding first or second end of the cassette may pivot about the other of the first and second receptacle during insertion or removal. As a result, the opposite end of the cassette may trace out an arc during insertion or removal, e.g., as the opposite end moves in the channel. The cassette may pivot about a substantially vertical axis. Accordingly, the arc may lie in a substantially horizontal plane. The opening may comprise a lower surface, which the corresponding first or second end of the cassette may rest on during installation or removal of the cassette.

The channel may be tapered such that the vertical height of the channel may be greater at a first end of the channel at which the corresponding first or second end of the cassette may be received during insertion than at a second end of the channel at which the corresponding first or second end of the cassette may be selectively locked by the locking mechanism.

The channel may be tapered such that the depth of the channel may be smaller at a first end of the channel at which the corresponding first or second end of the cassette may be received during insertion than at a second end of the channel at which the corresponding first or second end of the cassette may be selectively locked by the locking mechanism.

A vehicle, such as an automobile, van or any other vehicle, may comprise the above-mentioned roll cover assembly.

BRIEF DESCRIPTION OF THE DRAWINGS

For a better understanding of the present disclosure, and to show more clearly how it may be carried into effect, reference will now be made, by way of example, to the accompanying drawings, in which.

DETAILED DESCRIPTION

Figure 1A:
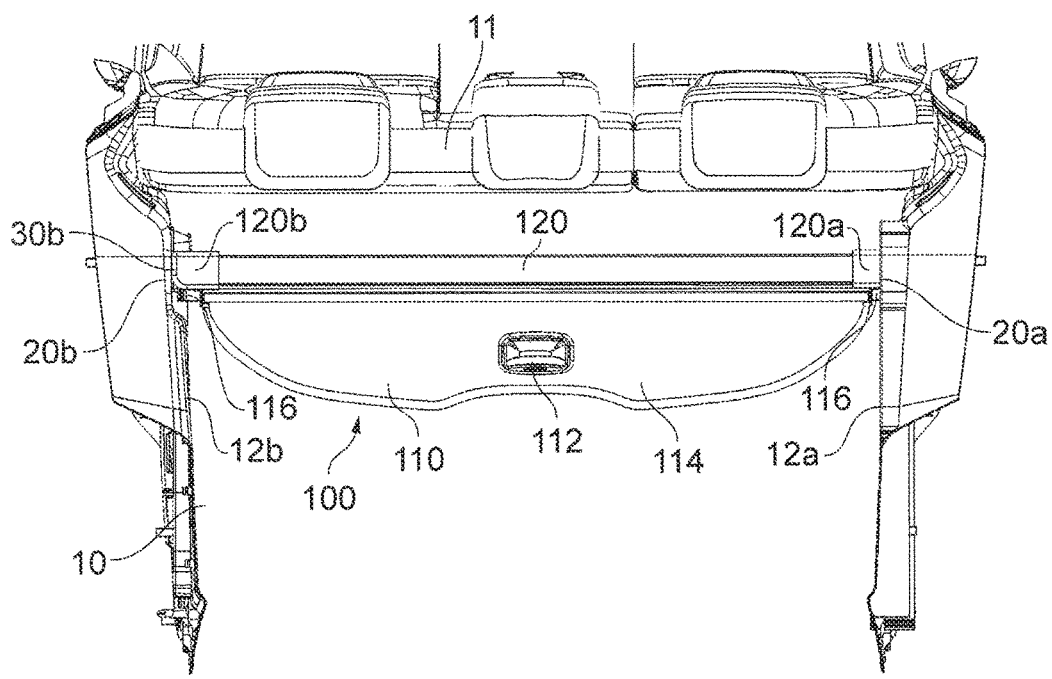
FIGS. 1A and 1B show a vehicle cargo space with a roll cover assembly according to the present disclosure in an installed position, with FIG. 1A showing a plan view of the cargo space and FIG. 1B showing a perspective view of the interface between the cargo space and the roll cover assembly.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

With reference to FIGS. 1 and 2, a roll cover assembly 100 for selectively covering a cargo space 10 of a vehicle, comprises a roll cover 110 and a cassette 120 for receiving or housing the roll cover 110. In the particular example shown, the roll cover assembly 100 may be provided behind seats 11 of the vehicle. The roll cover 110 may be wound around a shaft (not shown) in the cassette 120 and spring-loaded toward a retracted state. FIGS. 1 and 2 show the roll cover in the fully wound or retracted state. The roll cover 110 may be unwound by pulling a handle 112 to extract the roll cover from the cassette 120 and cover the cargo space 10. The handle 112 may be provided on a flap portion 114 which may be connected to the remainder of the roll cover 110. The flap portion 114 may be constrained from entering the cassette 120.

The cassette 120 comprises first and second ends 120a, 120b configured to engage respective first and second receptacles 20a, 20b in first and second side walls 12a, 12b of the cargo space 10. The cassette 120 may be removed from engagement with the first and second receptacles 20a, 20b. However, as will be described in further detail below, the roll cover assembly 100 further comprises a locking mechanism configured to selectively lock the cassette 120 when installed in the first and/or second receptacles 20a, 20b. The locking mechanism may be provided at either or both ends 120a, 120b of the cassette 120.

The roll cover assembly 100 further comprises a release device 130 configured to selectively release the locking mechanism, for example when it is desirable to remove the cassette from the cargo space 10. As depicted, the release device 130 may be a flexible member, such as a strap 132. The strap 132 may comprise a hoop 134, which may provide a handle for a user to pull. As will be described in more detail below, pulling the strap 132 relative to the cassette 120 releases the locking mechanism. Furthermore, the cassette 120 may be removed from the first and/or second receptacles 20a, 20b by pulling the strap 132. In this way, the cassette 120 may be released and removed from the cargo space 10 in a single action.

As depicted, the strap 132 may be operatively coupled to the cassette 120. In particular, the strap 132 may be coupled to the cassette 120 at any point between upper and lower surfaces 124a, 124b of the cassette. (As depicted, the upper and lower surfaces 124a, 124b of the cassette relate to the upward-facing and downward-facing surfaces when the cassette is installed in the vehicle.) In the particular example shown, the strap 132 may be coupled to the cassette 120 at a point at or towards the lower surface 124b of the cassette. For example, the strap 132 may be coupled to the cassette 120 at a point below the roll cover 110.

When pulled, the strap 132 may extend in a direction substantially parallel to the direction in which the cassette is removed. When not being pulled, the strap 132 may otherwise flop due its flexible nature. However, the strap 132 may have some rigidity such that the strap may extend parallel to the removal direction even when not being pulled, for example at its root where the strap is coupled to the cassette 120.

When pulled by the user, the flexible strap 132 ensures that a pulling line-of-action (indicated by arrow L in FIGS. 2A and 2B) at the interface with the cassette (e.g., the tension force in the strap 132) passes through the cassette 120. The pulling line-of-action may also extend in substantially the same direction as the cassette removal direction. As a result, the orientation and position of the strap 132 reduces the tendency for the cassette 120 to twist about its longitudinal axis, which may otherwise interfere with the removal.

Figure 1B:
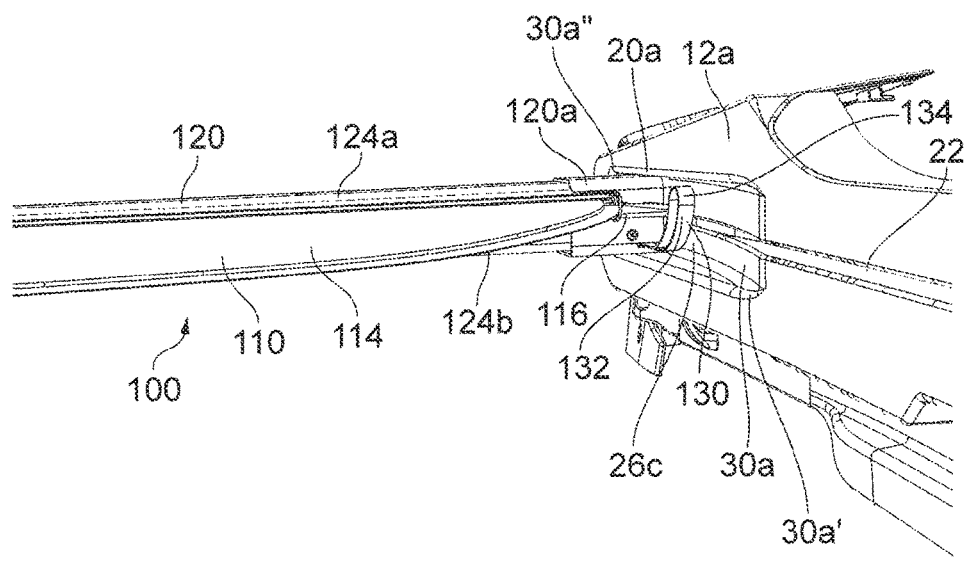
Figure 2A:
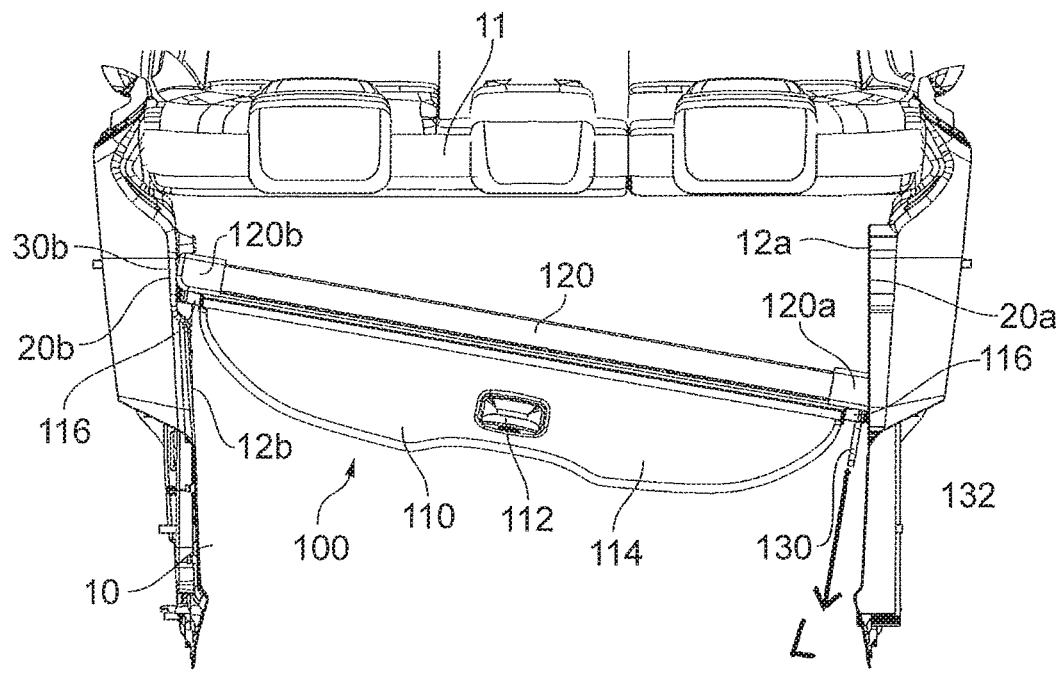
FIGS. 2A and 2B show the vehicle cargo space with the roll cover assembly during removal or installation, with FIG. 2A showing a plan view of the cargo space and FIG. 2B showing a perspective view of the interface between the cargo space and the roll cover assembly.
Figure 2B:
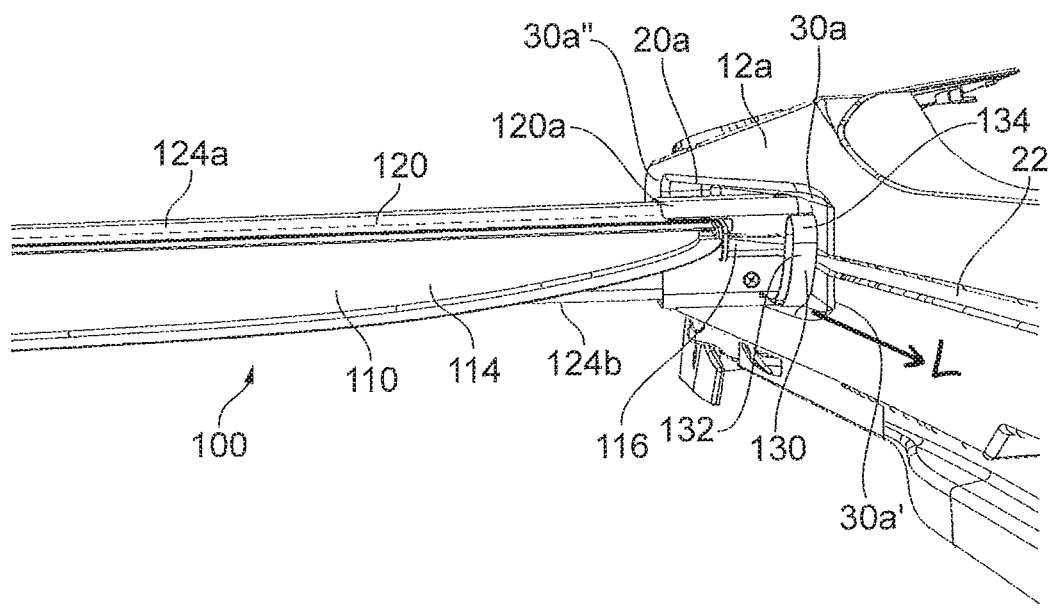

As depicted in FIGS. 1B and 2B, the first receptacle 20a may comprise a channel 30a, e.g., in the side wall 12a. The channel 30a may be disposed in a substantially longitudinal direction of the vehicle, e.g., from back to front, and may be arranged to slidably receive and guide the first end 120a of the cassette during insertion or removal of the cassette. FIG. 1B shows the first end 120a of the cassette in the inserted position and FIG. 2B shows the first end 120a of the cassette displaced rearward and away from the inserted position, e.g., during removal or insertion.

The channel 30a may be tapered such that the depth of the channel 30a (e.g., in the vehicle lateral direction) may be smaller at a first end 30a' of the channel at which the first end 120a of the cassette is received during insertion than at a second end 30a" of the channel at which the first end of the cassette is selectively locked by the locking mechanism. The depth of the channel may at least partially trace out an arc, for example with a radius substantially corresponding to the length of the cassette 120 and a center at the opening 30b proximate the second end 120b of the cassette.

Alternatively or additionally, the vertical height of the channel 30a may be tapered with the height of the channel being greater at the first (rearward) end 30a' of the channel than at the second (forward) end 30a" of the channel. In this way, the larger/deeper end 30a' of the channel 30a may facilitate insertion of the cassette first end 120a into the channel and the smaller end 30a" of the channel may assist in limiting movement of the cassette first end 120a when fully inserted. In particular, the height of the channel 30a at the second end 30a" of the channel may substantially conform to the corresponding height of the cassette first end 120a, such that the cassette may be held securely in place when fully inserted.

The strap 132 may be provided at the cassette first end 120a and at a point so that the strap 132 is substantially concealed in the channel 30a when the cassette 120 is in the installed position. Accordingly, the strap 132 is obscured from the plan view of FIG. 1A.

The second receptacle 20b may comprise an opening 30b, e.g., in the opposite side wall 12b to the channel 30a. The opening 30b may be configured to pivotingly receive the second end 120b of the cassette during insertion or removal. In other words, the cassette may pivot about its second end 120b after the second end is inserted in the opening 30b during insertion or removal of the cassette. Accordingly, the cassette first end 120a may trace out an arc during insertion or removal, e.g., as the first end moves in the channel 30a. FIG. 1A shows the cassette 120 in the inserted position and FIG. 2A shows the cassette as it is being inserted or removed.

The opening 30b may extend in a substantially lateral direction of the vehicle such that the second end 120b of the cassette may be inserted into the opening by moving the cassette in a direction with a lateral component. Once inserted, the opening 30b may limit movement of the cassette second end 120b in the longitudinal direction of the vehicle. The opening may also limit movement of the cassette second end 120b in the vertical direction. As a result, the cassette second end 120b is held in place by the opening 30b and a locking mechanism may not be required at the cassette second end 120b. However, in addition to a locking mechanism at the cassette first end 120a, a further or portion of a locking mechanism may nonetheless be provided at the second end 120b.

The width of the opening 30b (e.g., in the vehicle longitudinal direction) may taper, such that the width reduces with the depth of the opening. In this way, the wider end of the opening 30b may facilitate insertion of the cassette second end 120b into the opening and the narrower end of the opening 30b may assist in limiting movement of cassette second end 120b when fully inserted. In particular, the width of the opening 30b at the bottom of the opening may substantially conform to the corresponding width of the cassette second end 120b, such that the cassette may be held securely in place when fully inserted.

To install the cassette 120 in the cargo space 10, the cassette second end 120b may first be inserted into the opening 30b with the cassette at an angle relative to the vehicle lateral direction, in an orientation generally similar to that shown in FIG. 2B. The cassette first end 120a may then be slid into the first end 30a' of the channel 30a and the cassette may be pivoted (about the second end 120b engaged with the opening 30b) until the cassette first end 120a reaches the second end 30a" of the channel. The locking mechanism may then lock the cassette in place.

To remove the cassette 120 from the cargo space 10, the locking mechanism is deactivate or released by pulling the release device 130. Pulling the release device 130 may also cause the cassette first end 120a to slide in the channel 30a as the cassette pivots about the second end 120b. Once the cassette 120 has pivoted a certain amount, the cassette second end 120b may be removed from the opening 30b and thus the cargo space 10 altogether.

It will be appreciated that the opening 30b may comprise a lower surface which the cassette second end 120b, e.g., the lower surface 124b, rests on. The cassette second end 120b may rest on the opening lower surface not only when in an installed position, but also during installation or removal of the cassette. In this way the cassette 120 may be conveniently supported at its second end 120b during installation or removal such that a user may only have to handle the cassette first end 120a.

As depicted in FIGS. 1 and 2, the release device 130 may be provided at the cassette first end 120a. Accordingly, when a user pulls the release device 130 the cassette first end 120a may slide in the channel 30a. It will be appreciated that the line-of-action for the force applied to the release device 130 by the user may initially be substantially in the vehicle longitudinal direction. The line-of-action may subsequently remain substantially in the vehicle longitudinal direction or the line-of-action may be substantially parallel to a tangent of the arc traced out by the cassette first end 120a. It is also envisaged that the line-of-action may be between or beyond these two extremes.

In an alternative arrangement (not shown), the cassette 120 may be removed without pivoting about one of its ends 120a, 120b. For example, the cassette 120 may be removed by sliding it linearly, e.g., with the cassette remaining parallel to the vehicle lateral direction. With such an alternative arrangement, both receptacles may be provided with channels that can slidably guide the first and second ends of the cassette during insertion or removal. The release device may be provided at or towards a mid-point along the length of the cassette.

With reference to FIGS. 1B and 2B, a slot 22 may be provided in the side wall 12a of the cargo space 10. The slot 22 may receive a guide tab 116 extending laterally from the flap portion 114. The guide tab 116 and slot 22 may together guide the roll cover 110 as it is unwound from the cassette 120. As depicted, the slot 22 may extend into the channel 30a. Although not shown, a corresponding slot may be provided on the opposite side wall 12b.

Figure 3:
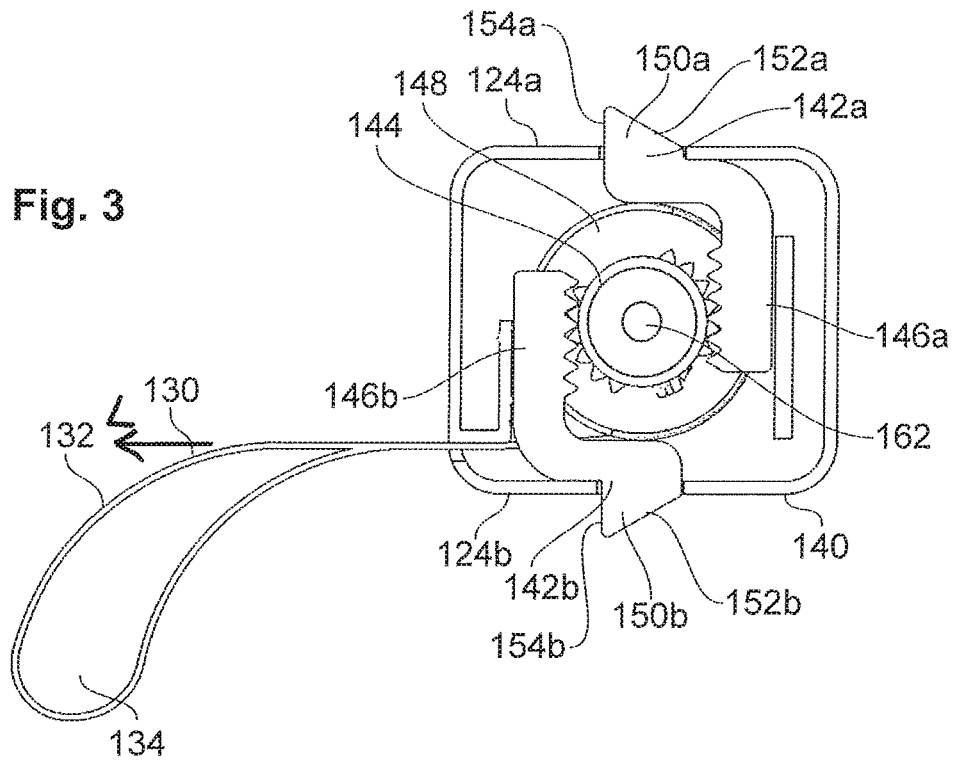
FIG. 3 shows a cutaway side view of a locking mechanism and a release device according to the present disclosure.
Figure 4:
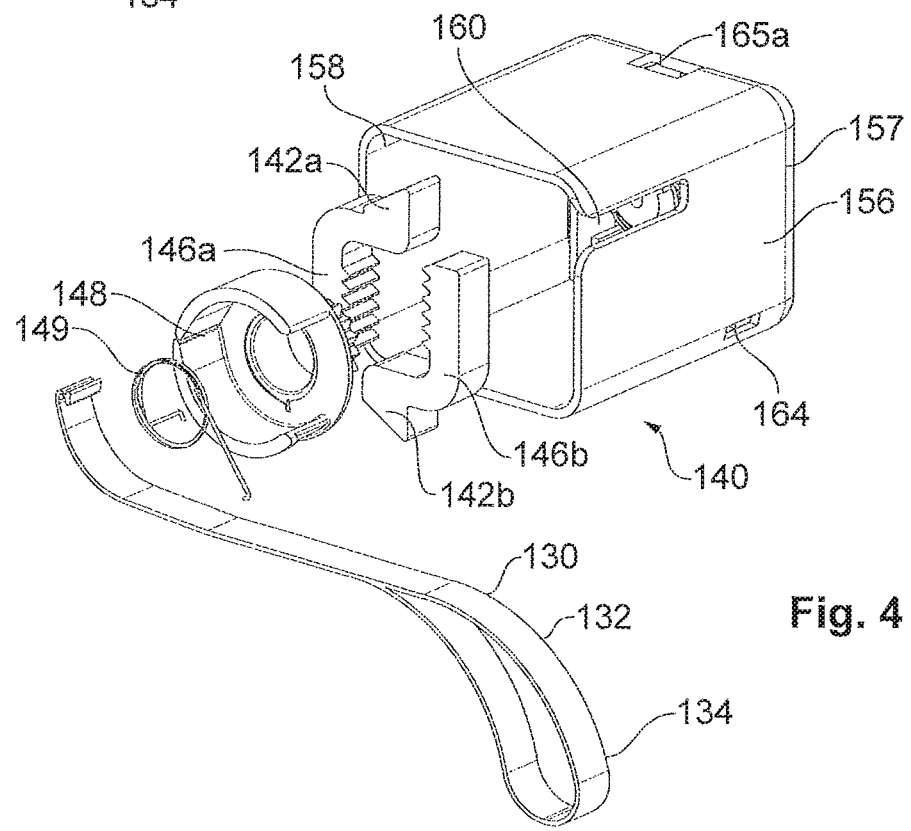
FIG. 4 shows an exploded view of the locking mechanism and the release device according to the present disclosure.

Referring now to FIGS. 3 to 5, further details of the locking mechanism 140 will be described. The depicted locking mechanism 140 is provided at the first end 120a of the cassette 120. The locking mechanism 140 may comprise first and second latching members 142a, 142b, which are movable, e.g., slidable, relative to the cassette. The latching members 142a, 142b selectively latch in respective first and second recesses 24a, 24b provided in the first receptacle 20a. (Although two latching members and recesses are shown, it will be appreciated that any other number of latching members and recesses may be provided.)

Figure 5A:
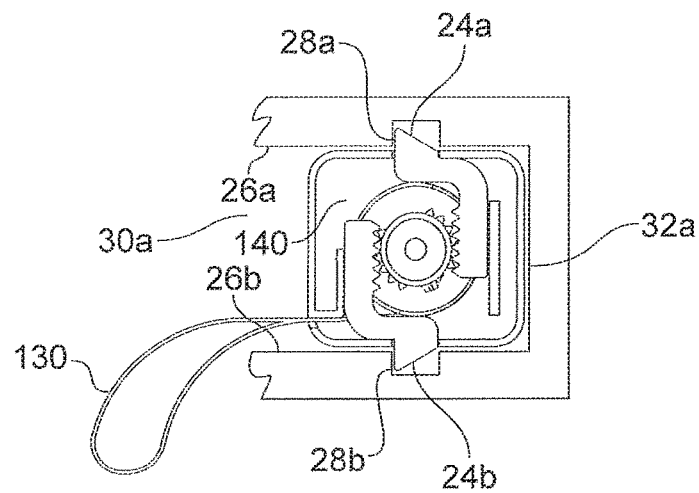
FIGS. 5A-5C show cutaway side views of the locking mechanism and release device during release of the roll cover assembly from the cargo space, with FIG. 5A showing the locking mechanism prior to release, FIG. 5B showing the locking mechanism in a retracted position and FIG. 5C showing the roll cover assembly removed from the installed position.
Figure 5B:
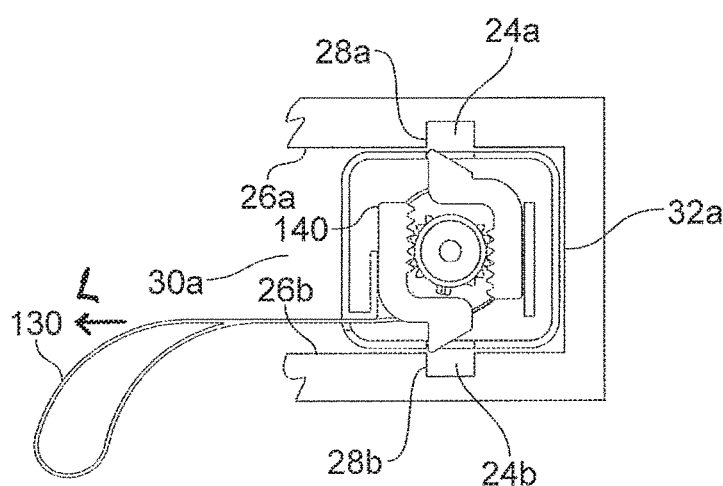
Figure 5C:
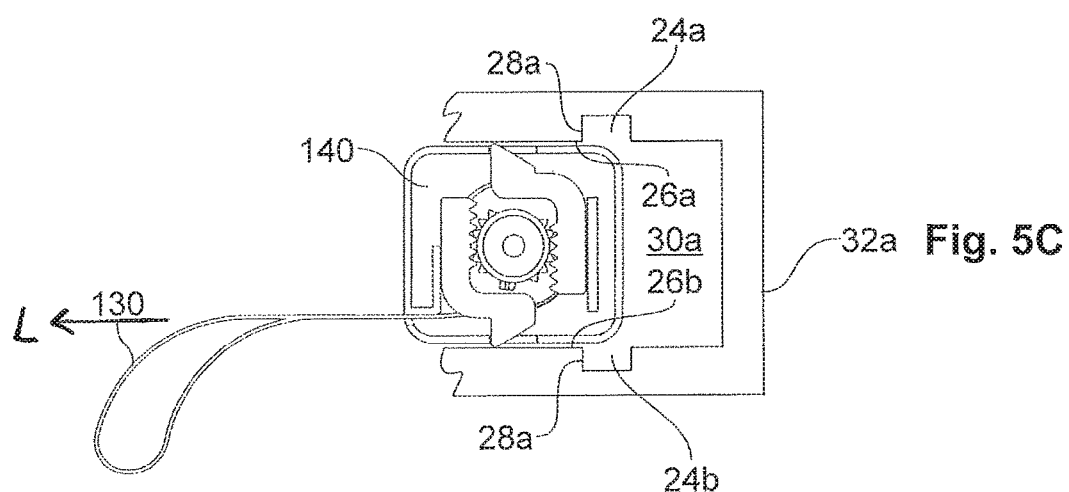

The first and second latching members 142a, 142b are provided on the upper and lower surfaces 124a, 124b of the cassette respectively. Accordingly, the first and second recesses 24a, 24b are provided on upper and lower surfaces 26a, 26b of the channel 30a respectively. As shown in FIGS. 3 and 5A, the latching members 142a, 142b may extend beyond the upper and lower surfaces 124a, 124b of the cassette when in a latched state. By contrast, as shown in FIGS. 5B and 5C, the latching members 142a, 142b may be retracted so as not to extend beyond the upper and lower surfaces 124a, 124b of the cassette and the cassette 120 may then be moved relative to the channel 30a.

As depicted, the locking mechanism 140 may comprise a rack and pinion mechanism. In particular, the release device 130, e.g., strap 132, may be operatively coupled to a pinion gear 144. The latching members 142a, 142b may be operatively coupled to respective racks 146a, 146b of the rack and pinion mechanism. As shown in FIG. 5B, activation, e.g., pulling, of the release device 130 may cause the pinion gear 144 to rotate, which in turn causes the racks 146a, 146b to slide and the latching members 142a, 142b to retract. (In an alternative arrangement, the release device 130 may be operatively coupled to one of the racks 146a, 146b and activation of the release device may then cause both racks to slide thanks to the intermediate pinion gear 144.)

The release device 130 may be connected to a rotatable carrier 148. The carrier 148 may be connected to the pinion gear 144 with a common axis of rotation, e.g., such that the pinion gear 144 and carrier 148 are constrained to rotate together. The carrier 148 and pinion gear 144 may be integral. The carrier 148 may have a radius that is greater than the radius of the pinion gear 144. The release device 130 may thus be provided with a mechanical advantage to assist in moving the latching members 142a, 142b.

The latching members 142a, 142b may be resiliently biased into the extended position, e.g., by virtue of a coil spring 149 acting on the carrier 148 or the pinion gear 144. Alternatively or additionally, other resilient members, e.g., springs may act on the racks 146a, 146b and/or latching members 142a, 142b directly so as to bias the latching members into the extended position.

The latching members 142a, 142b may comprise wedge-shaped portions 150a, 150b which may be integral with the respective racks 146a, 146b. The wedge-shaped portions 150a, 150b may comprise angled surfaces 152a, 152b and engaging surfaces 154a, 154b. The angled surfaces 152a, 152b may be configured so that an interaction between the angled surfaces and the respective upper and lower surfaces 26a, 26b of the channel 30a causes the latching member to retract as the cassette is inserted into the channel. By contrast, the engaging surfaces 154a, 154b may be substantially perpendicular to the direction in which the cassette moves upon removal. As depicted in FIG. 5A, the engaging surfaces 154a, 154b may therefore engage a corresponding wall 28a, 28b of the first and second recesses 24a, 24b such that when the latching members protrude from the cassette, the cassette may not move. A channel end wall 32a may prevent movement of the cassette in the opposite direction.

To facilitate retraction of the latching members 142a, 142b from the recesses 24a, 24b when the release device 130 is being pulled, the materials at the recess wall 28a, 28b and latching member engaging surfaces 154a, 154b may be selected for their low friction properties. For example, the latching members 142a, 142b and/or channel 30a may comprise low friction plastics, such as PTFE.

The locking mechanism 140 may be provided in an end cap 156 at the first end of the cassette 120 (as best seen in FIG. 4). The end cap 156 may comprise an opening 158 to receive the remainder of the cassette and a slot 160 for the roll cover to pass through. The pinion gear 144 may be rotatably coupled to the end cap 156, e.g., by virtue of a shaft 162 attached to the end cap. The racks 146a, 146b may be constrained to slide in the end cap 156. The strap 132 may extend through a further slot 164 provided in the end cap. The latching members 142a, 142b may protrude through respective openings 165a in the end cap 156.

Although the latching members 142a, 142b shown extend perpendicular to the longitudinal axis of the cassette, in an alternative arrangement one or more latching members may extend in a direction parallel to the longitudinal axis of the cassette. For example, such latching members may extend through an end wall 157 of the end cap and may engage a recess in a side wall 26c of the channel 30a.

Figure 6A:
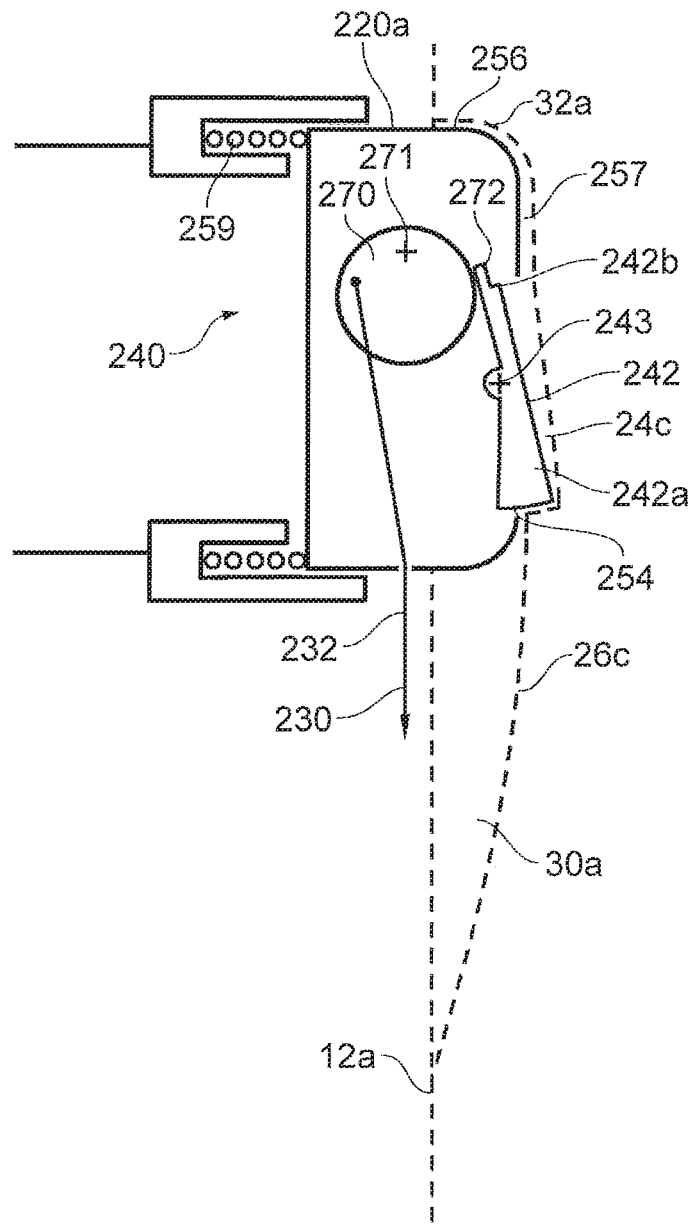
FIGS. 6A-6C show sectional plan views of an alternative locking mechanism according to the present disclosure with FIG. 6A showing the locking mechanism prior to release, FIG. 6B showing the locking mechanism in a retracted position and FIG. 6C showing the roll cover assembly removed from the installed position.
Figure 6B:
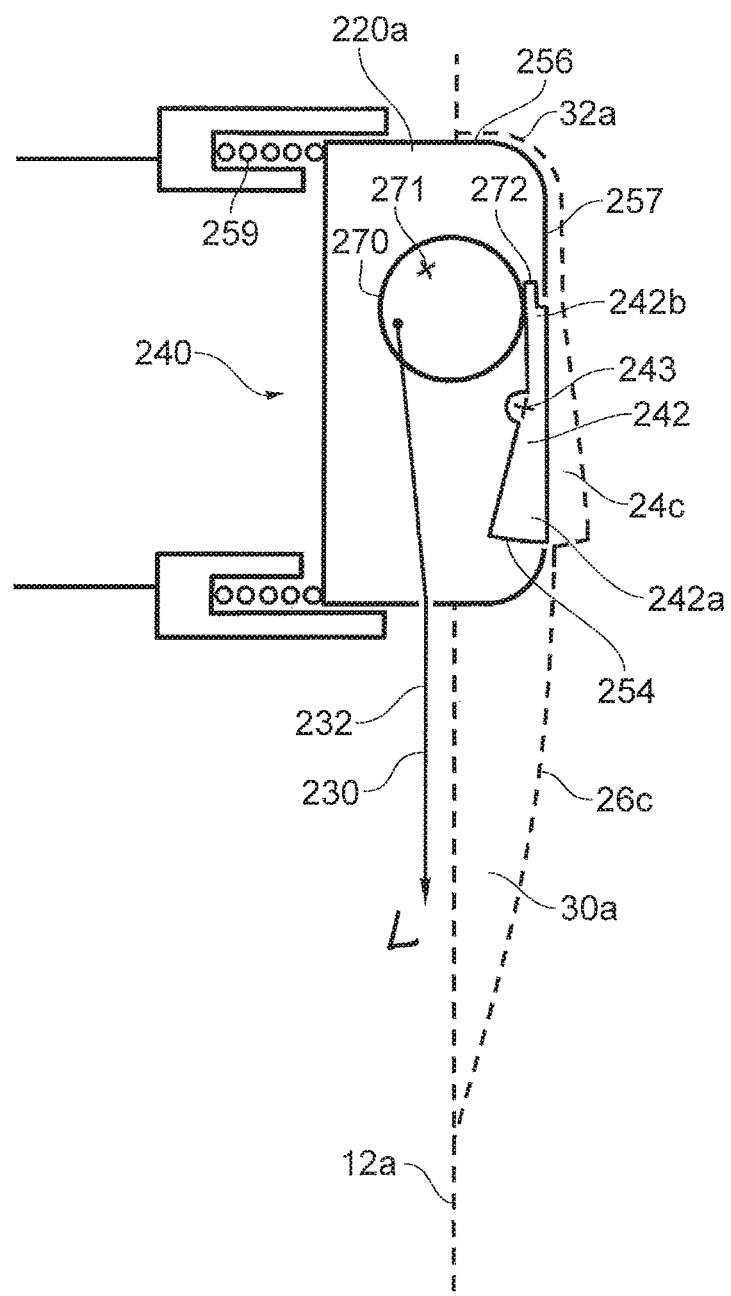
Figure 6C:
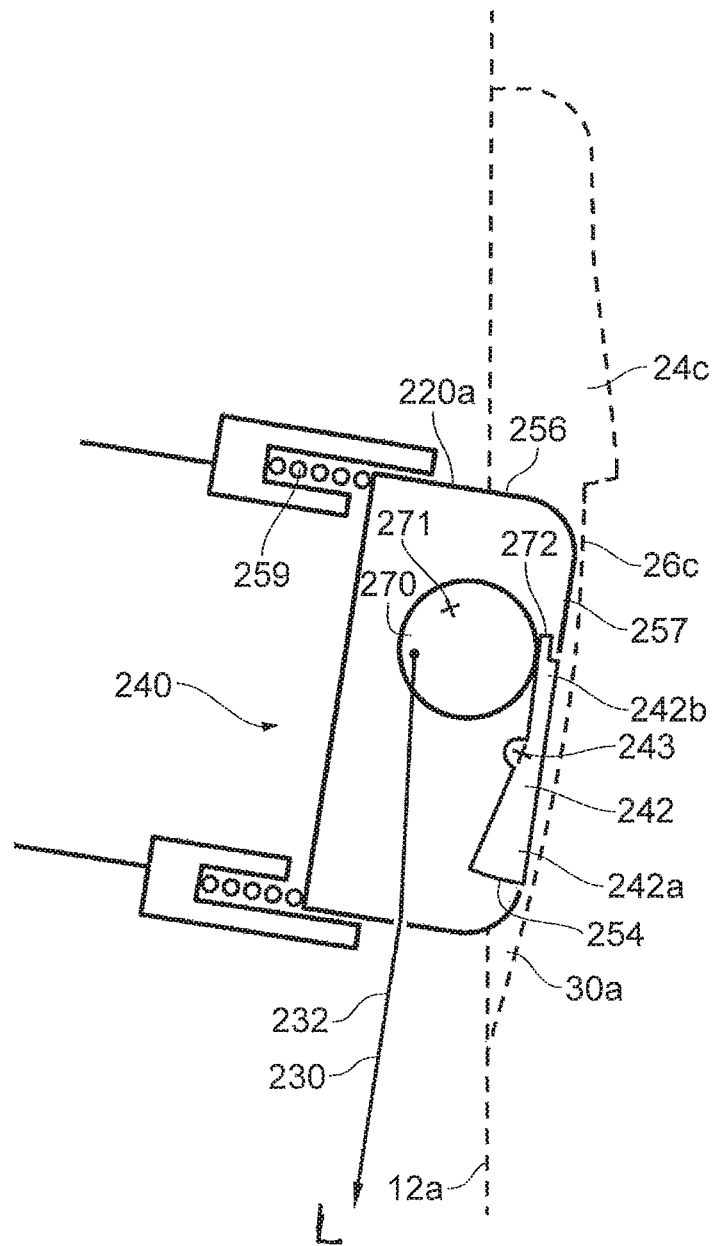

Referring to FIGS. 6A-6C, an alternative locking mechanism 240 is shown. As is depicted, the locking mechanism 240 may comprise a cam 270 and a corresponding cam surface 272. The release device 230 may be operatively coupled to the cam 270 and the latching member 242 may be operatively coupled to the cam surface 272. In the particular example shown, the latching member 242 may comprise the cam surface 272. The latching member 242 may be retracted by virtue of an interaction between the cam and cam surface.

The latching member 242 may be rotatable about a pivot point 243. A first end 242a of the latching member 242 may selectively extend through the end wall 257 of the end cap 256. The first end 242a of the latching member 242 comprises an engaging surface 254 that selectively engages a recess 24c in the side wall 26c of the channel 30a. The latching member 242 may be biased into the engaging position shown in FIG. 6a by a resilient member, such as a coil spring (not shown). A second end 242b of the latching member 242 may comprise the cam surface 272. The cam 270 may also be rotatable about a pivot point 271. The cam 270 may be circular and the pivot point 271 may be offset from the center of the cam. Alternatively, the cam 270 may be non-circular, e.g., with a varying radius.

As depicted in FIGS. 6A and 6B, the cam 270 may be rotated by pulling the release device, e.g., strap 232. Rotation of the cam 270 may move the second end 242b of the latching member, causing the latching member to rotate and the first end 242a of the latching member to retract into end wall 257 of end cap 256 and out of engagement with the recess 24c. As depicted in FIG. 6c, once the latching member 242 has been retracted, the first end 220a of the cassette may move past the recess 24c in the side wall 26c of the channel 30a and the first end 220a of the cassette may slide in the channel 30a.

As shown in FIGS. 6A-C, the end cap 256 may optionally be slidable relative to the remainder of the cassette 220 in the direction of the cassette longitudinal axis. A resilient member, such as a spring 259, may be provided to resiliently bias the end cap 256 away from the remainder of the cassette. The outward biasing of the end cap 256 may assist in securing the cassette 220 in the first and second receptacles 20a, 20b. It will be appreciated that the resiliently biased and slidable end cap may also optionally apply to other locking mechanisms, such as the locking mechanism 140 depicted in FIGS. 3 to 5.

In an alternative arrangement (not shown), the locking mechanism may comprise a guide configured to redirect movement of the release device. The guide may comprise a pulley, post or any other guide means. For example, a flexible release device may be redirected by a guide, such as a pulley, and the flexible release device may be connected to the latching members (directly or by some other means) such that pulling the flexible release device moves the latching members into a retracted position.

It will be appreciated by those skilled in the art that although the invention has been described by way of example with reference to one or more examples, it is not limited to the disclosed examples and that alternative examples could be constructed without departing from the scope of the invention as defined by the appended claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An assembly for a vehicle comprising:
   first and second receptacles disposed on opposite sides of a cargo space of the vehicle;
   a cassette receiving a roll cover extendable to cover at least a portion of the cargo space and having cassette first and second ends engageable with the first and second receptacles respectively;
   a locking mechanism releasably locking the cassette first end into the first receptacle; and
   a release device connected to the locking mechanism and configured to release the cassette first end from the first receptacle by withdrawing a latching member of the locking mechanism from engagement with the first receptacle, wherein the release device is a tether;
   wherein the first receptacle includes a channel configured to slidably guide the cassette first end during insertion of the cassette first end into the first receptacle, the channel being tapered in a longitudinal direction such that a depth of the channel is smaller at a first receiving end of the channel than at a second locking end of the channel at which the cassette first end is locked by the locking mechanism.

2. The assembly of claim 1, wherein the channel is tapered such that the depth of the channel is smaller at the first receiving end of the channel which initially receives the cassette first end during insertion than at the second locking end of the channel at which the cassette first end is locked by the locking mechanism.

3. The assembly of claim 1, wherein the first receptacle includes a recess for receiving the latching member of the locking mechanism.

4. The assembly of claim 1, wherein the second receptacle defines an opening configured to receive the second end of the cassette and permit pivoting of the second end relative to the opening during removal of the cassette first end from the first receptacle.

5. An assembly comprising:
   a cassette configured to receive a roll cover configured to extend and retract from the cassette in order to cover a vehicle cargo space, the cassette having an end removably engageable with a receptacle of the vehicle adjacent the cargo space;
   a locking mechanism retaining the end in the receptacle of the vehicle; and
   a release device connected to the locking mechanism, the release is a tether configured to release the locking mechanism by pulling the tether along a line parallel with a direction in which the end translates during removal from the receptacle of the vehicle.

6. The assembly of claim 5, wherein the tether is a flexible member.

7. The assembly of claim 5, wherein the release device is configured such that a line-of-action is closer to a lower surface of the cassette than an upper surface of the cassette.

8. The assembly of claim 5, wherein the locking mechanism comprises a latching member, the latching member configured to releasably latch into a recess provided in the receptacle.

9. The assembly of claim 8, wherein the locking mechanism comprises a rack-and-pinion mechanism to withdraw the latching member from the recess in response to a pulling of the release device.

10. The assembly of claim 9, wherein the release device is connected to a rotatable carrier, and the rack-and-pinion mechanism includes a rack and a pinion, the carrier being connected to the pinion with a common axis of rotation, wherein the release device is connected to the carrier at a point with a distance from the common axis that is greater than a radius of the pinion at an interface with the rack.

11. The assembly of claim 10, wherein the locking mechanism comprises a cam and a cam surface, the release device being operatively coupled to one of the cam or cam surface.

12. The assembly of claim 11, wherein the latching member is operatively coupled to an other of the cam and cam surface such that the latching member is releasable by virtue of an interaction between the cam and cam surface.

13. A roll-cover assembly comprising:
a cassette having an end engageable with a receptacle, the cassette configured to receive a roll cover, and a rack-and-pinion mechanism including a release device a rack, and a pinion, a latching member of the rack maintaining the end in the receptacle, the release device connecting to a rotatable carrier which is connected to the pinion with a common axis of rotation, the release device being a strap connected to the carrier at a distance from the axis that is greater than a radius of the pinion at an interface with the rack, the cassette configured to unlatch and release from the receptacle as a result of pulling the strap along a line parallel with a direction in which the end of the cassette translates dining removal from the receptacle.

14. The roll-cover of claim 13, wherein the release device is connected to the carrier at a location closer to a lower surface of the cassette than an upper surface of the cassette.

* * * * *